(12) United States Patent
Lerouge et al.

(10) Patent No.: US 8,412,953 B2
(45) Date of Patent: Apr. 2, 2013

(54) SYSTEM AND METHOD FOR ANNOTATION DRIVEN INTEGRITY VERIFICATION

(75) Inventors: Julien Lerouge, Santa Clara, CA (US); Ginger M. Myles, San Jose, CA (US); Tanya Michelle Lattner, San Jose, CA (US); Augustin J. Farrugia, Cupertino, CA (US)

(73) Assignee: Apple Inc, Cupertino, CA (US)

( * ) Notice: Subject to any disclaimer, the term of this patent is extended or adjusted under 35 U.S.C. 154(b) by 671 days.

(21) Appl. No.: 12/550,334

(22) Filed: Aug. 28, 2009

(65) Prior Publication Data

US 2011/0055638 A1    Mar. 3, 2011

(51) Int. Cl.
*G06F 9/44* (2006.01)
(52) U.S. Cl. ........ 713/189; 717/124; 717/126; 717/127; 717/140; 714/48; 714/11.32; 714/11.25; 713/187
(58) Field of Classification Search .................. 713/187, 713/189; 714/48, 11.25, 11.32; 717/124, 717/126, 127, 140
See application file for complete search history.

(56) References Cited

U.S. PATENT DOCUMENTS

| | | | |
|---|---|---|---|
| 7,013,460 B2 | 3/2006 | Thompson et al. | |
| 7,281,237 B2 | 10/2007 | de Jong | |
| 7,287,166 B1 * | 10/2007 | Chang et al. | 713/187 |
| 2004/0044739 A1 | 3/2004 | Ziegler | |
| 2004/0143814 A1 * | 7/2004 | de Jong | 717/104 |
| 2006/0130021 A1 | 6/2006 | Plum et al. | |
| 2007/0192623 A1 | 8/2007 | Chandrasekaran | |
| 2009/0037884 A1 | 2/2009 | Benameur et al. | |

* cited by examiner

*Primary Examiner* — Kaveh Abrishamkar
*Assistant Examiner* — Ayoub Alata
(74) *Attorney, Agent, or Firm* — Novak Druce Connolly Bove + Quigg LLP

(57) ABSTRACT

Disclosed herein are methods, systems, and computer-readable storage media for annotation driven integrity program verification. The method includes distributing verification calls configured to verify a function across call paths leading to the function in source code, generating a binary from the source code having placeholders associated with the verification calls, and filling each placeholder in the binary with verification data or reference checksums. Alternatively, the method includes receiving source code having a verification call, replacing the verification call with one or more equivalent verification calls distributed over a call path, replacing each verification call with a checksum function generating placeholders while compiling, generating a binary based on the placeholders, and filling each placeholder in the binary with reference checksums. The system includes a processor and a module controlling the processor to perform the methods. The computer-readable storage medium includes instructions for controlling a computer to perform the methods.

13 Claims, 6 Drawing Sheets

US 8,412,953 B2

SYSTEM AND METHOD FOR ANNOTATION DRIVEN INTEGRITY VERIFICATION

BACKGROUND

1. Technical Field

The present disclosure relates to program binaries and more specifically to annotation-driven integrity verification of program binaries.

2. Introduction

Software developers implement various protection schemes in an effort to prevent attackers, also known as software crackers, from modifying program binaries. These protection schemes traditionally have included copy protection, trial/demo versions, serial number checks, hardware keys, date checks, etc. The goal of the attacker is to remove or bypass the protection scheme. Typically, the attacker modifies the binary to prevent a specific call to the protection scheme. The attacker accomplishes this by debugging or tracing the binary until the protection scheme is called, at which point the attacker can modify the binary by replacing the call to the protection scheme, or causing the binary to skip over the call to the protection scheme.

For example, in a binary that has a trial period of 14 days, the binary will check to see if the trial period has expired, and if so, terminate itself. The attacker will reverse engineer the binary using the debugger, and upon finding the call to the protection scheme, will "patch" the binary and either prevent the call to the protection scheme, or modify the binary such that the protection scheme check does not fail.

Once the protection scheme of the binary has been successfully broken, the binary is typically distributed freely across the Internet in peer-to-peer networks, or reproduced and sold illegally. In both situations, the software developer is not compensated for his or her efforts in developing the program binary. Cracking is also detrimental to software developers in the sense that "cracked" software is often buggy and prone to crashing, thereby causing users to form bad opinions of the software, and, the "cracked" software may be accompanied by malware. Current protection schemes have not been successful in preventing attackers from modifying program binaries.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are methods, systems, and tangible computer-readable storage media for annotation driven integrity verification. The method includes distributing verification calls to verify a function across call paths leading to the function in source code, generating, via a processor, a binary from the source code having placeholders associated with the verification calls, and filling each placeholder in the binary with reference checksums or some other data used to verify the function. One or more steps are performed by hardware components such as a processor or computing device.

The verification call includes a verification group, a verification strength, corruption data, and a checksum module. The corruption data may include instructions for silently corrupting the binary, or instructions for returning an error. In one embodiment, the method includes generating annotated verification groups descriptions, filling each placeholder based on the annotated verification groups descriptions, and verifying a part of the binary. The method may also include filling each placeholder during a postprocessing stage, and linking the placeholders in the binary.

In another embodiment, the method includes receiving source code having a verification call, replacing the verification call with verification calls distributed over a call path, replacing each verification call with a checksum function or other function for verification, generating placeholders as part of a compiling process, generating a binary based on the placeholders, and filling each verification checksum placeholder in the binary with reference checksums.

The system includes a processor and modules configured to control the processor to perform the methods. In one embodiment, the system includes a module to distribute verification calls that verify a function across call paths leading to the function in source code, and a module to distribute, across a binary, placeholders associated with the verification calls while compiling the source code. The system also includes a module to fill each placeholder in the binary with reference checksums, a module to perform function verification, and a module configured to silently corrupt the binary if a function verification fails.

The tangible computer-readable storage medium includes instructions for causing a data processing device or processor to perform the steps of initiating at least one verification call of distributed across call paths of a function, generating a verification code of the function associated with the verification call, comparing the verification code with a checksum of a linked list of checksums, and if the verification code does not match the checksum, at least one of silently corrupting a binary, returning an error.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
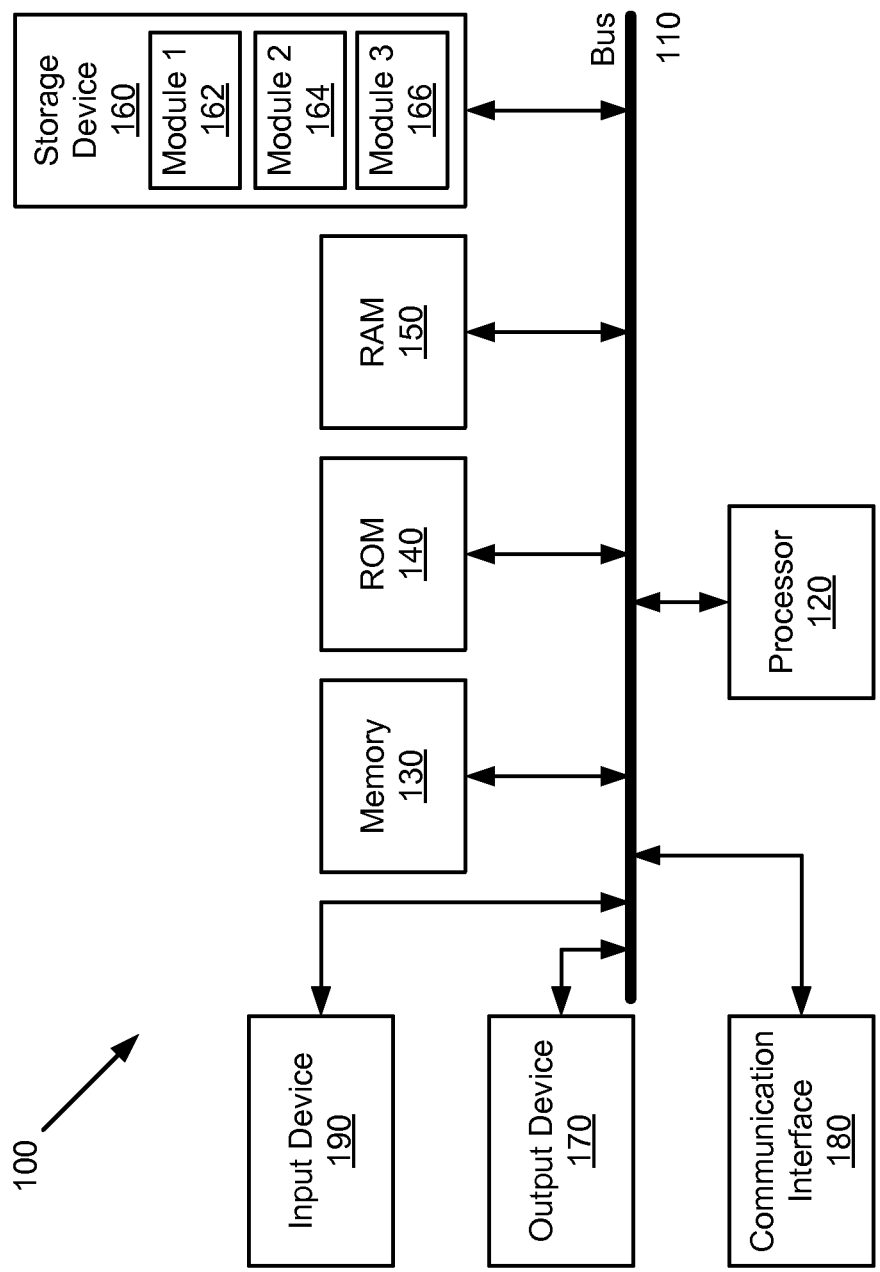
FIG. 1 illustrates an example system embodiment.

FIG. 1 is a schematic block diagram illustrating an exemplary system 100 of a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Module 1 162, Module 2 164 and Module 3 166 which are modules configured to control the processor 120. These modules may be stored on the storage device 160 and loaded into RAM 150 or memory 130 at runtime or may be stored as would be known in the art in other computer-readable memory locations.

Figure 2:
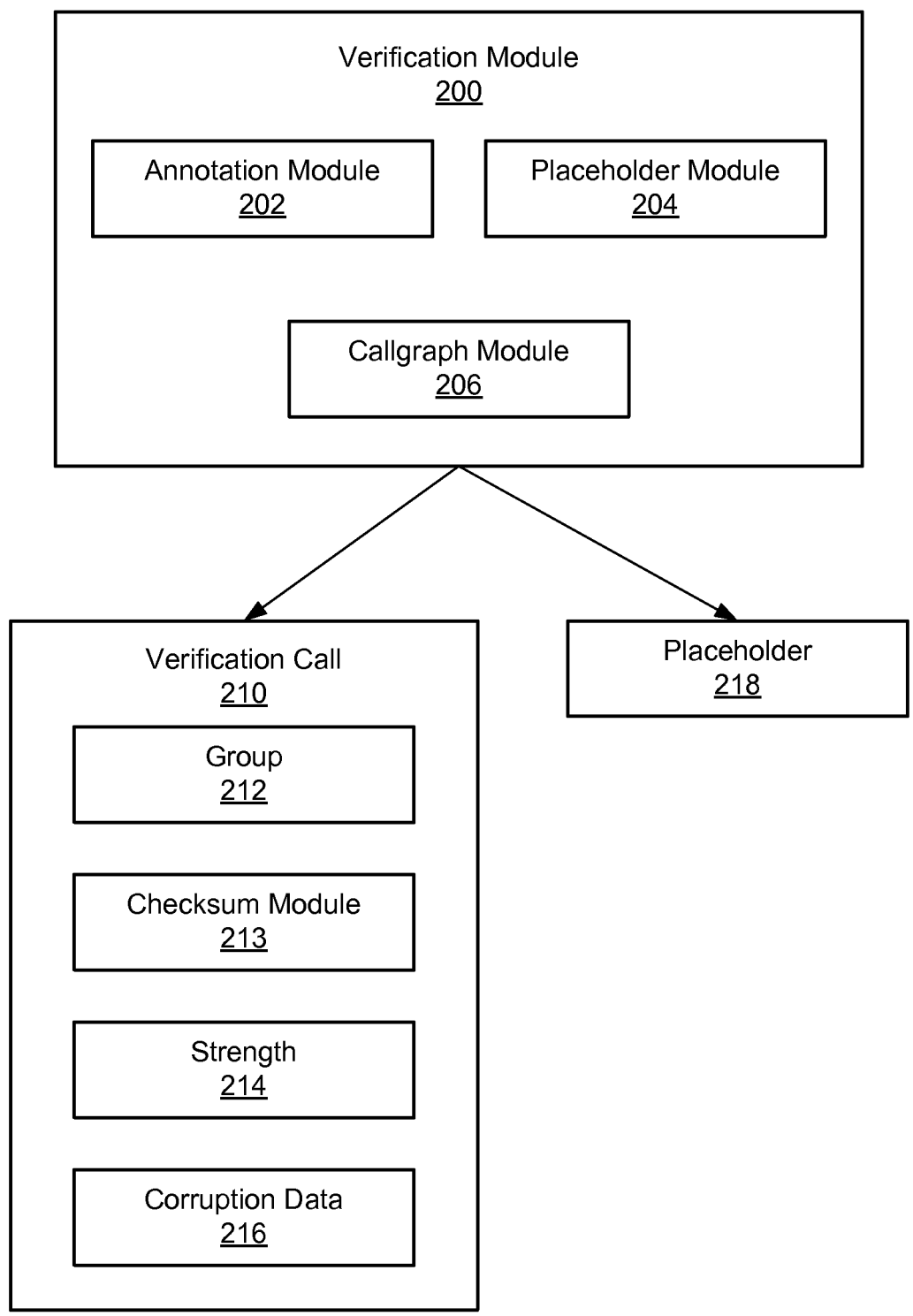
FIG. 2 is a schematic block diagram illustrating one embodiment of a verification module.

FIG. 2 is a schematic block diagram illustrating one embodiment of a verification module 200. The verification module 200 is similar to the modules 162, 164, 166 described above with reference to FIG. 1, and is likewise capable of controlling the processor 120 to perform certain steps as will be described below. The verification module 200, in one embodiment, includes an annotation module 202, a placeholder module 204, and a callgraph module 206.

The verification module 200 provides fine grain verification to prevent an attacker from being able to run a modified version of a program binary (hereinafter "binary") by enabling, among other features, control over parts of the binary that should be verified, when the parts should be verified, and how much processor time is allowed for verification.

Parts of a binary that may be verified by the verification module include, but are not limited to, functions, routines, subroutines, procedure, etc.

To accomplish fine grain verification, the verification module 200 utilizes the annotation module 202, the placeholder module 204, and the callgraph module 206 to generate verification calls 210 and placeholders 218. As will be discussed in greater detail below, the verification calls 210 are inserted inline in source code and contain a checksum module 213 for verifying functions. Placeholders 218, in one example, are distributed across a binary during compile time and later filled with checksum information. In one embodiment, the checksum module 213 is a checksum algorithm that calculates a checksum of a function and compares the checksum with a value maintained in a respective placeholder 218.

The annotation module 202 annotates the parts or portions of a program that will be verified by identifying functions, procedures, etc., in the source code and tagging the function as a function that will be verified during runtime. This tagging, for example, includes inserting inline the verification call 210 along a call path. The annotation module 202, in one embodiment, generates verification groups 212 that include a group of functions, for example. A function may be associated with one or more verification groups 212.

The annotation module 202 distributes verification calls across a function call path to ensure there is no single point of failure in the verification process. The annotation module 202, in one embodiment, may utilize the callgraph module 206 to identify the various call paths that initiate a single function or group of functions. One example of a callgraph is illustrated below with reference to FIG. 3. The callgraph module 206 analyzes the source code to identify the call paths of the particular functions, procedures, or routines of a program. By identifying the call path, the annotation module 202 can insert verification calls 210 in each path leading to a specific function.

The annotation module 202 may receive as input, from a programmer for example, functions to include in a verification group 212. Alternatively, the annotation module 202 may identify similar functions based on any number of similarities. The similarities, for example, may be based on input, output, subroutines called by the function, etc. In a further embodiment, the programmer may insert the verification call 210 manually into the source code.

The verification call 210 also includes a strength 214 and corruption data 216. The strength 214 defines, for example, how much processor time can be spent doing the verification. Additionally, the strength 214 may define how many verification calls 210 each function requires. The corruption data 216 includes arbitrary code that silently corrupts the binary when a verification fails. Additionally, the corruption data 216 may include an error message to be presented to the user in the event of a verification failure.

The checksum module 213 is responsible for verifying that a function has not been modified by an attacker. The checksum module 213 may be a checksum algorithm chosen from a pool of commonly available checksum algorithms, or alternatively, the checksum module 213 may include proprietary hashing functionality, for example. The checksum module 213 also is responsible for verifying a part of the final binary, respecting relocations and other system dependent features. In one embodiment, the checksum module 213 is included in each instance of the verification call such that each time the verification call 210 is initiated, the checksum module 213 verifies the function associated with the verification call 210.

Alternatively, a single checksum module 213 may be implemented and called each time a verification call 210 is encountered in a function call path.

Figure 3:
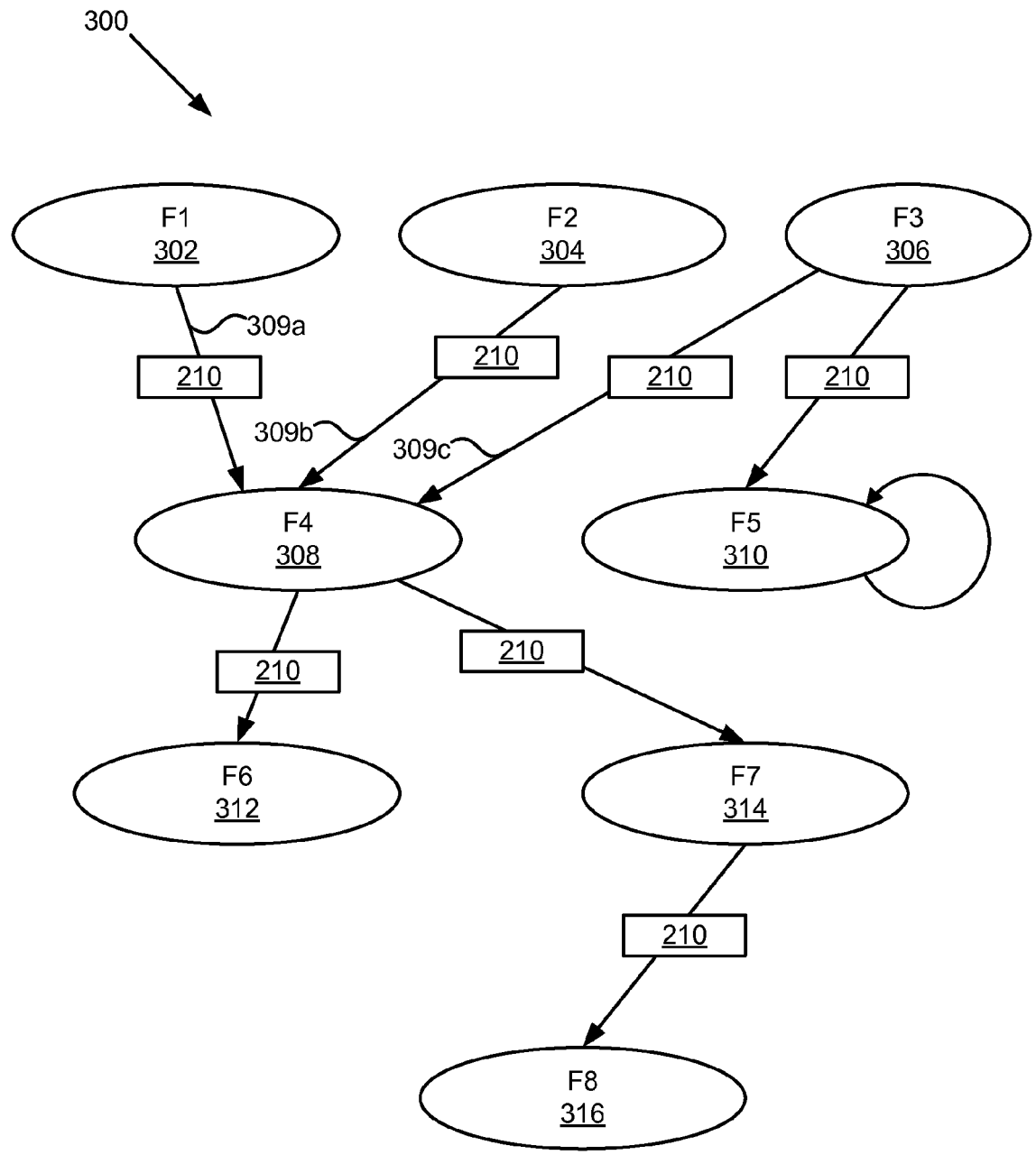
FIG. 3 is a schematic diagram illustrating one embodiment of a callgraph.

FIG. 3 is a schematic diagram illustrating one embodiment of a callgraph 300. The callgraph module 206, as described above, generates a callgraph 300 to identify the call paths of a function. For example, the function F4 308 has three possible call paths 309a, 309b, 309c that originate with functions F1 302, F2 304, and F3 306, respectively. In this example, the annotation module 202 will insert a verification call 210 in each call path 309a, 309b, 309c to ensure that each call path 309a, 309b, 309c to function F4 308 is verified. Function F5 310 has a call path that includes only F3 306 and one verification call 210 or equivalent instructions distributed throughout the call path. Function F6's 312 call path is the same as F4 308, but also including F4 308 and an extra verification call 210 between F4 308 and F6 312. eVerifying a function, in one embodiment, includes calculating a hash or checksum to determine if the function has been modified. In another embodiment, verifying a function includes identifying the call path to ensure the function is called as intended, or in other words, verifying that an attacker has not bypassed the intended call path of the function.

A call path to a function may require that intermediate functions are first activated. For example, a call to function F8 316 from function F3 306 will first call F4 308 and then F7 314. The annotation module 202 inserts verification calls 210 in each call path leading to function F8 316. The number of verification calls 210 that are inserted along a call path is determined by the strength 214 of the verification call 210. The strength 214 may be a predetermined value set by a programmer, or alternatively, automatically determined by the verification module 200 according to the function associated with the verification call 210. Different functions or groups of functions can have varying degrees of associated strength 214. For example, a group of functions involved in a security key exchange may have a higher strength requirement, and therefore more verification calls 210 distributed along the call path, than a group of functions performing non-security related tasks.

Figure 4:
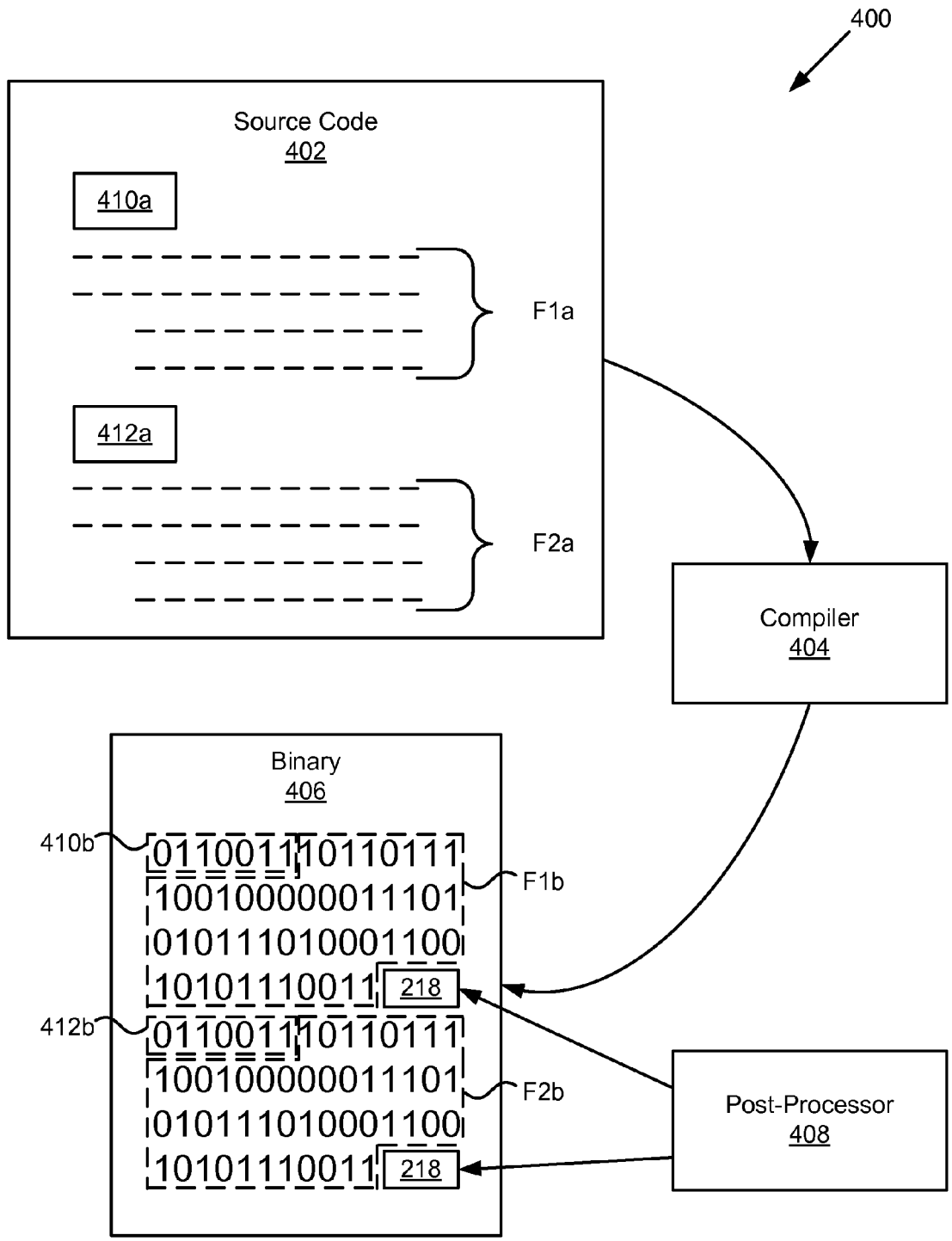
FIG. 4 is an illustration graphically depicting a compiling system.

FIG. 4 is an illustration graphically depicting a compiling system 400. FIG. 4 is intended to illustrate, by way of example only, the process of compiling source code into a binary or machine code. Many components of a compiling system, known to those of skill in the art, have been omitted for clarity. The illustrated binary code is illustrative only of the concept of compiling verification calls into the binary, and inserting at compile time placeholders.

The system 400, in one embodiment, depicts source code 402 as input for a compiler 404, and a binary program 406 as output of the compiler 404. Alternatively, the output of the compiler 404 is any machine-readable code. The source code 402, as one skilled in the art knows, is human-readable computer programming language. The source code 400 includes one or more functions, depicted here as functions F1 and F2. The verification module 200 inserts verification calls 410a, 412a inline with the functions F1a and F2a as described above. Alternatively, the verification module 200 may insert a reference to verification call 410b, 412b. In other words, verification calls 410a, 412a are inserted or included in the source code in such a way as to ensure that functions are called and proceed in a same order as they were programmed to process.

The compiler 404 outputs a binary program 406 that includes a binary representation or implementation of the verification calls 410b, 412b, and the functions F1b and F2b, and also includes placeholders 218 distributed across the binary 406. The placeholders 218 are initially filled with junk data during compile time. The junk data represents a recognizable pattern that can later be filled with valid check sum data, for example.

The system 400 also includes a post-processor 408 that, in one embodiment, analyzes the binary 406 and searches for the placeholders 218. The post-processor 408, in a further embodiment, replaces the junk data maintained by the placeholder 218 with valid verification data or checksum data. The post-processor 408 also generates a linked list of placeholders 218 to identify the location or memory offset of the placeholders 218 in the binary.

The schematic flow chart diagrams included herein are generally set forth as logical flow chart diagrams. As such, the depicted order and labeled steps are indicative of one embodiment of the presented method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagram, they are understood not to limit the scope of the corresponding method. Indeed, some arrows or other connectors can be used to indicate only the logical flow of the method. For instance, an arrow can indicate a waiting or monitoring period of unspecified duration between enumerated steps of the depicted method. Additionally, the order in which a particular method occurs can or cannot strictly adhere to the order of the corresponding steps shown. One or more steps of the following methods are performed by a hardware component such as a processor or computing device.

Figure 5:
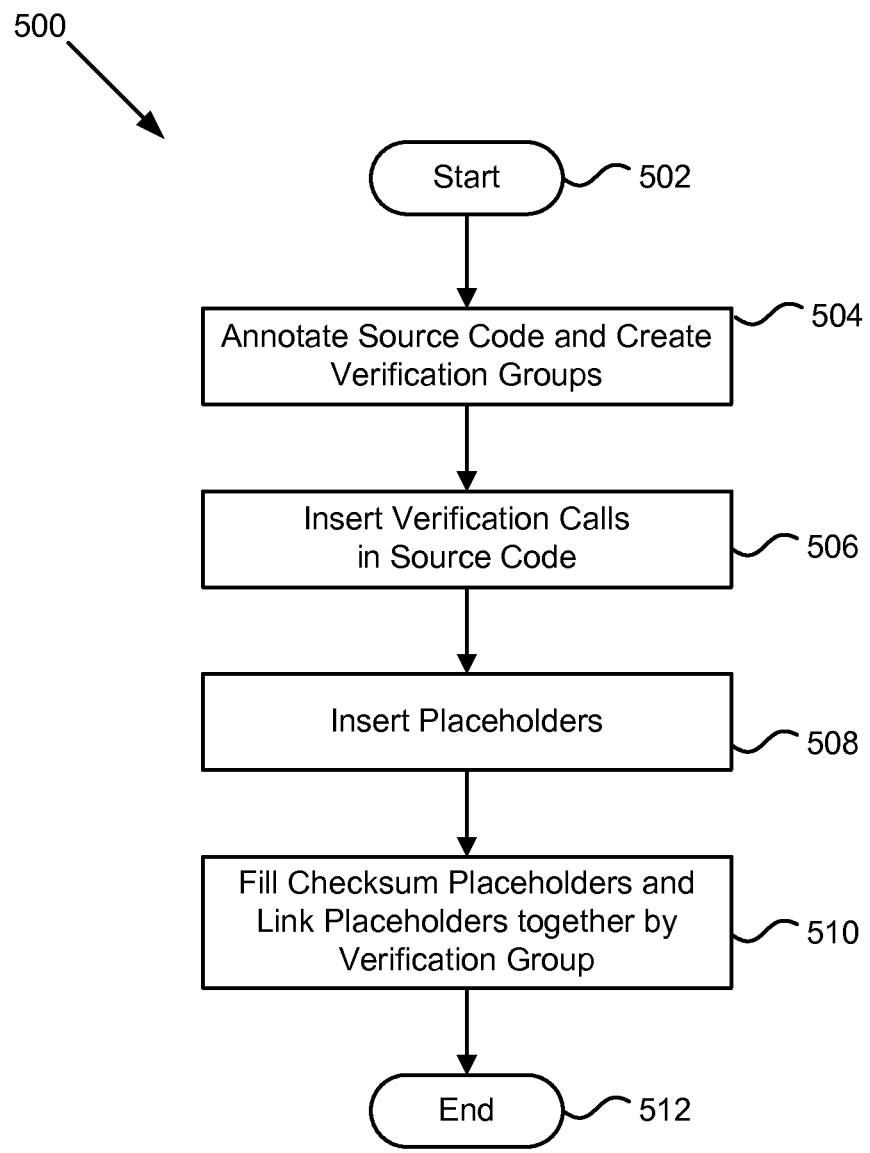
FIG. 5 is a schematic flow chart diagram illustrating a method of generating a binary.

FIG. 5 is a schematic flow chart diagram illustrating a method 500 of generating a binary. The method 500 starts 502 and the annotation module annotates 504 source code and creates verification groups. In one embodiment, annotating 504 source code includes the annotation module 202 of FIG. 2 annotating a function to be verified. Alternatively, a programmer may annotate a function which, subsequently, the annotation module 202 detects and inserts 506 verification calls 210 across the call paths of the annotated functions.

The annotation module 202, in a further embodiment, inserts the verification calls 210 across the call paths of the annotated functions according to a callgraph. As described above with reference to FIG. 3, the callgraph module 206 generates a callgraph that identifies the call paths of the annotated functions. As such, the annotation module 202 can insert a verification call 210 on each call path that calls the annotated functions and prevent an attacker from bypassing a verification call 210.

In one embodiment, a compiler compiles the source code and inserts 508 placeholders. The compiler inserts 508, for example, identifiable junk data into the placeholders and generates a binary. A post-processor then analyzes the binary, searching for the junk data, and fills 510 the placeholders with valid checksum data or other data for verifying a function. The post-processor then links the placeholders together. In one embodiment, placeholders associated with a verification group are linked together. Alternatively, all placeholders in a binary are linked together. The method 500 then ends 512.

Figure 6:
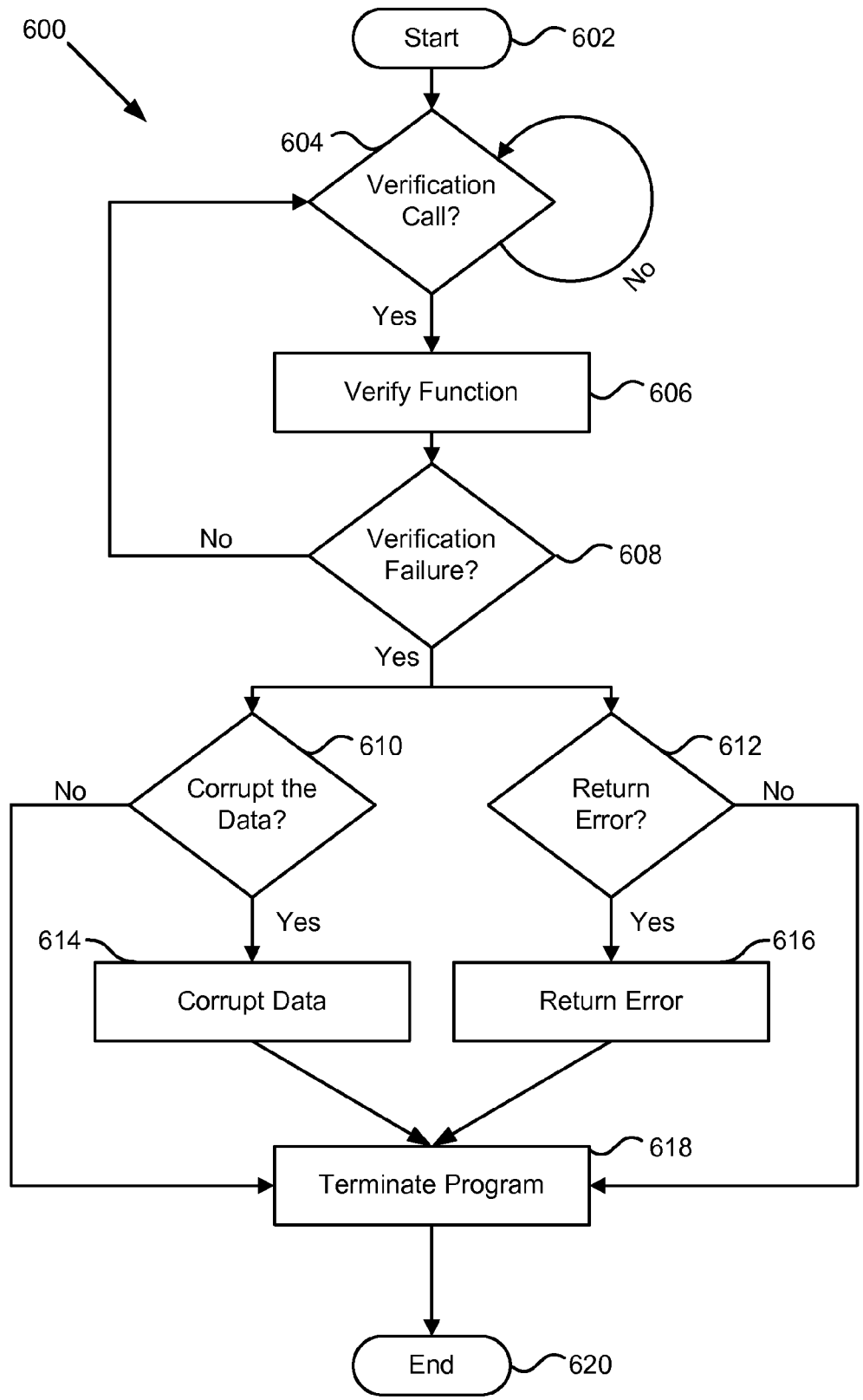
FIG. 6 is a schematic flow chart diagram illustrating a method of annotation driven integrity verification.

FIG. 6 is a schematic flow chart diagram illustrating a method 600 of annotation driven integrity verification. The method 600 starts 602 and a binary with verification calls is activated. During the runtime of the binary, a verification call is activated 604, and the checksum module 213 of FIG. 2 verifies 606 the function or group of functions associated with the activated verification call. In one embodiment, verifying 606 the function includes generating a checksum of the function and comparing the generated checksum with the value inserted into the placeholder associated with the verification group. If the generated checksum is different, then verification fails 608. If the checksum module successfully verifies 608 the function then the binary continues running and waiting 604 for the next verification call.

As described above with reference to FIG. 2, the verification call 210 includes corruption data 216. In one embodiment, the corruption data 216 can indicate a programmer's desire to silently corrupt the binary, and/or return an error. Consequently, following a verification failure 608, and depending on the corruption data, the checksum module 213 can corrupt 610 and/or return 612 an error. Alternatively, the corruption data can indicate a programmer's desire to simply terminate 618 the operation of the program.

If the corruption data includes instructions to corrupt the data 610, the checksum module 213 corrupts 614 the data. If the corruption data includes instructions to return an error message, the checksum module returns 616 an error. Afterwards, the checksum module terminates 618 the program and the method 600 ends 620.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
  receiving source code, the source code including at least one annotated function;
  generating, via a processor, a binary from the source code, the generating comprising:
    inserting a plurality of verification calls configured to verify the at least one annotated function, wherein at least one verification call is inserted on each call path leading to the at least one annotated function, and further wherein at least one verification call is configured to perform at least one of silently corrupting the binary or returning an error when the verification code does not match a reference checksum, and wherein each verification call comprises a verification group, a verification strength, corruption data, and a checksum module, wherein the verification strength defines at least one of a maximum processor time spent on verification or a number of verification calls to insert;
    distributing placeholders associated with the plurality of verification calls, wherein a placeholder comprises junk data representing a recognizable pattern; and
    replacing the junk data in each placeholder in the binary with verification data, wherein a placeholder is identified through the recognizable pattern, whereby the replacing eliminates the recognizable pattern.

2. The method of claim 1, the method further comprising:
  generating annotated verification groups descriptions; and
  filling each placeholder based on the annotated verification groups descriptions.

3. The method of claim 1, wherein replacing each placeholder occurs during a post-processing stage.

4. The method of claim 1, the method further comprising linking the placeholders in the binary.

5. A computer-implemented method comprising:
  receiving via a processor source code having a verification call comprising one or more groups to verify, a verification strength parameter, corruption instructions, and a checksum module, wherein the verification strength parameter defines at least one of a maximum processor time spent on verification or a number of verification calls to insert;
  generating a binary from the source code, the generating comprising:
    replacing the verification call with one or more equivalent verification calls distributed over each call path leading to the verification call, wherein at least one verification call is configured to perform at least one of silently corrupting the binary or returning an error when the verification code does not match a reference checksum;
    replacing each equivalent verification call with a checksum function selected from a pool of checksum functions;
    inserting verification checksum placeholders comprising junk data representing a recognizable pattern, wherein each verification checksum placeholder is associated with a verification chunk;
    replacing the junk data in each verification checksum placeholder in the binary with reference checksums, wherein a placeholder is identified through the recognizable pattern, whereby the replacing eliminates the recognizable pattern.

6. The computer-implemented method of claim 5, wherein the checksum function verifies a part of the binary.

7. The computer-implemented method of claim 5, the method further comprising:
  generating annotated verification groups descriptions; and
  wherein filling each verification checksum placeholder is based on the annotated verification groups descriptions.

8. The computer-implemented method of claim 5, wherein replacing each verification checksum placeholder occurs during a post-processing stage.

9. The computer-implemented method of claim 5, the method further comprising linking the reference checksums in the binary.

10. A system for generating a computer executable binary, the system comprising:
  a processor;
  a module configured to control the processor to generate a binary from source code, the generating comprising:
    a module configured to control the processor to insert a plurality of verification calls configured to verify at least one function, wherein at least one verification call is inserted on each call path leading to the at least one function, and further wherein at least one verification call is configured to silently corrupt the binary or return an error when verification fails, wherein each verification call of the plurality of verification calls comprises a verification group, a verification strength, corruption data, and a checksum function, and further wherein the verification strength defines at least one of a maximum processor time spent on verification or a number of verification calls to insert;
  a module configured to control the processor to distribute, across the binary, placeholders associated with the plurality of verification calls, wherein a placeholder comprises junk data representing a recognizable pattern
  a module configured to control the processor to replace the junk data in each placeholder in the binary with reference checksums, wherein a placeholder is identified through the recognizable pattern, whereby the replacing eliminates the recognizable pattern.

11. The system of claim 10, further comprising a module configured to control the processor to generate annotated verification groups descriptions.

12. The system of claim 10, further comprising a module configured to control the processor to generate a linked list of placeholders.

13. A non-transitory computer-readable storage medium storing a set of program instructions executable on a data processing device, the instructions causing the data processing device to perform the steps:
  receiving source code, the source code including at least one annotated function;
  generating a binary from the source code, the generating comprising:

inserting a plurality of verification calls configured to verify the at least one annotated function, wherein at least one verification call is inserted on each call path leading to the at least one annotated function, and further wherein at least one verification call is configured to perform at least one of silently corrupting the binary or returning an error when the verification code does not match a reference checksum, and wherein each verification call comprises a verification group, a verification strength, corruption data, and a checksum module, and further wherein the verification strength defines at least one of a maximum processor time spent on verification or a number of verification calls to insert;

inserting placeholders associated with the plurality of verification calls, wherein a placeholder comprises junk data representing a recognizable pattern; and replacing the junk data in each placeholder in the binary with verification data, wherein a placeholder is identified through the recognizable pattern, whereby the replacing eliminates the recognizable pattern.

\* \* \* \* \*

UNITED STATES PATENT AND TRADEMARK OFFICE
CERTIFICATE OF CORRECTION

PATENT NO. : 8,412,953 B2  
APPLICATION NO. : 12/550334  
DATED : April 2, 2013  
INVENTOR(S) : Julien Lerouge et al.

Page 1 of 1

It is certified that error appears in the above-identified patent and that said Letters Patent is hereby corrected as shown below:

In the Claims:

In Claim 1, Column 9, line 29, please change "the verification code" to --a verification code--.

In Claim 5, Column 9, line 66, please change "the verification code" to --a verification code--.

In Claim 13, Column 11, line 7, please change "the verification code" to --a verification code--.

Signed and Sealed this  
Thirteenth Day of August, 2013

Teresa Stanek Rea  
*Acting Director of the United States Patent and Trademark Office*